(12) United States Patent
Cooper et al.

(10) Patent No.: US 7,552,623 B2
(45) Date of Patent: Jun. 30, 2009

(54) ENHANCED LEAK DETECTION DYE CARRIER

(75) Inventors: B. William Cooper, Lloyd Harbor, NY (US); John Duerr, Massapequa Park, NY (US)

(73) Assignee: Spectronics Corporation, Westbury, NY (US)

(*) Notice: Subject to any disclaimer, the term of this patent is extended or adjusted under 35 U.S.C. 154(b) by 6 days.

(21) Appl. No.: 11/579,264

(22) PCT Filed: May 5, 2004

(86) PCT No.: PCT/US2004/014136
§ 371 (c)(1), (2), (4) Date: Feb. 1, 2008

(87) PCT Pub. No.: WO2005/113807
PCT Pub. Date: Dec. 1, 2005

(65) Prior Publication Data
US 2008/0265213 A1   Oct. 30, 2008

(51) Int. Cl.
*G01M 3/04* (2006.01)
*C09K 3/00* (2006.01)

(52) U.S. Cl. .............. 73/40.7; 252/68; 252/301.19; 252/408.1; 252/964

(58) Field of Classification Search .............. 73/40.7; 252/68, 301.19, 964
See application file for complete search history.

(56) References Cited

U.S. PATENT DOCUMENTS 5,650,563 A   7/1997   Cooper et al. ............ 73/40.7
RE36,951 E   11/2000   Cooper et al. ............ 73/40.7

*Primary Examiner*—Daniel S Larkin
(74) *Attorney, Agent, or Firm*—Drinker Biddle & Reath LLP

(57) ABSTRACT

A leak detection dye carrier is formed using a two-stage process (53). In a first stage, the dye carrier (52) is saturated with a mixture (54) of a dye powder and an evaporable solvent, such as alcohol. The solvent is permitted to evaporate leaving dispersed dye solids (56) on the dye carrier (52). In a second stage, the dye carrier (52) and dispersed dye solids (56) are immersed in a wet bath (58). The method may be a hybrid of dry and wet systems of placing dye onto a substrate carrier in which the wet bath is a mixture of a dye and a solvent, such as a system lubricant. Alternatively, the immersion of the dye carrier in the second stage may be limited in duration to prevent the dye solids in the first stage from being dissolved.

19 Claims, 5 Drawing Sheets

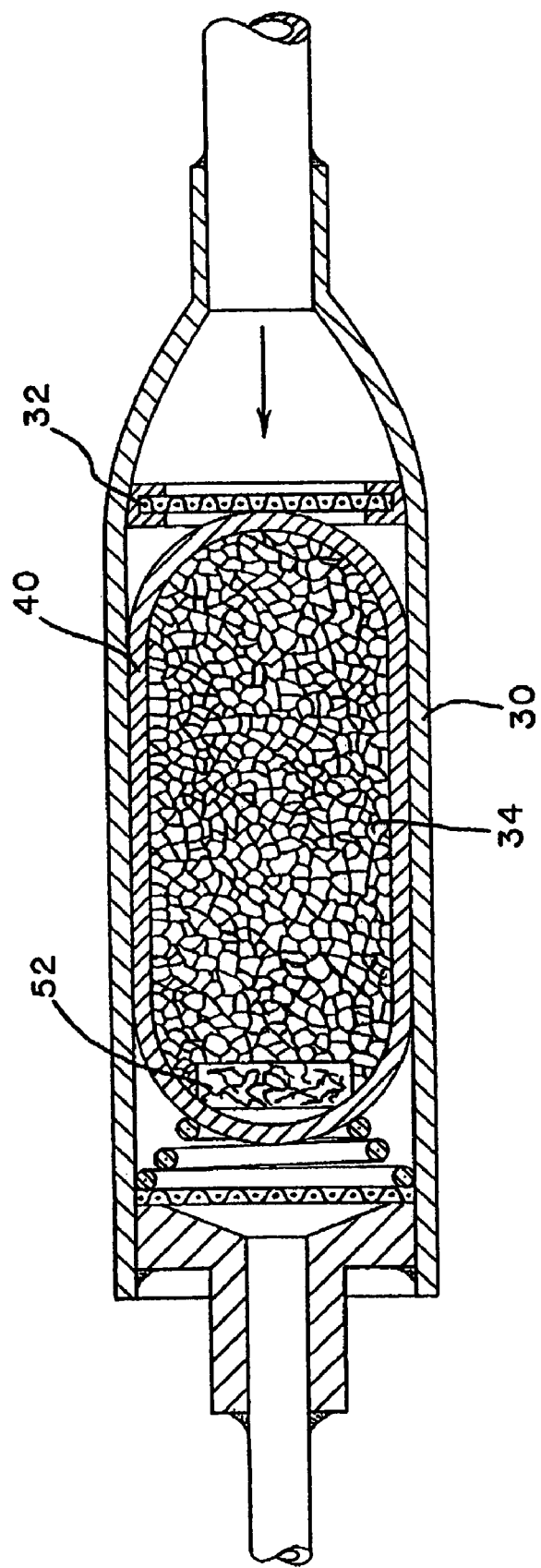

ENHANCED LEAK DETECTION DYE CARRIER

FIELD OF THE INVENTION

This invention relates generally to the field of leak detection in an air conditioning or other refrigeration system and, more particularly, to leak detection systems in which a dye is introduced into a circulated refrigerant.

BACKGROUND OF THE INVENTION

There has long been a need to locate leaks in closed refrigeration systems, originally because the loss of refrigerant reduces the cooling capacity of the system, and increasingly because the refrigerants themselves are potential hazardous or deleterious substances when released to the atmosphere. In particular, the production and use of chlorofluorocarbon (CFC) and hydrochlorofluorocarbon (HCFC) refrigerants is scheduled for incremental phaseout, and for recovery and recycling in the interim.

Various methods have been used for detecting and locating leaks in a refrigeration system. Since a slow leak of refrigerant is essentially silent and invisible, such methods have included halide torches, electronic sensors, coating exterior joints with material which reacts with the refrigerant, and injecting various types of dye into the refrigeration equipment to locate sites where the dye exits the system.

One of the most effective methods for detecting leaks in refrigeration systems, and a preferred method to be practiced with the present invention, comprises introducing into the refrigeration system an effective amount of a fluorescent dye compound. The dye compound circulates with the refrigerant and oil throughout the refrigeration circuit, and is carried out with escaping refrigerant and oil at a leak site. When the refrigeration system is exposed to ultraviolet light, even a small deposit of the dye compound is brilliantly fluorescent to allow visual detection of the leak. U.S. Pat. No. 5,149,453 discloses such a method for detecting leaks in a refrigeration system, and its content is incorporated herein by reference.

When practicing the above method of leak detection with a fluorescent dye, care has to be taken that the fluorescent dye additive is not allowed to contact the exterior of the refrigeration system as the dye is being introduced into the system. If dye additive is inadvertently spilled or rubbed on the exterior of the system, it will be difficult to distinguish between fluorescence from a leak site and that resulting from inadvertent external contact. This is a particular concern where the dye additive is used for quality assurance checks of air conditioners on newly assembled automobiles, as the air conditioning system's final assembly is usually completed in the automobile assembly line, after which the system is charged with refrigerant and leak detection additive, then operated to circulate the additive and reveal any leaks when viewed under ultraviolet light. While care is normally taken to prevent the refrigerant, lubricant and dye from escaping, the nature of the assembly and charging process creates a risk of spills or inadvertent contamination on clothing or tools. Since very low concentration of dye is required to produce fluorescence, any dye, dyed refrigerant or oil spilled or rubbed on the exterior of the air conditioning system may cause false leak indications.

It is known as disclosed in U.S. Pat. No. 5,650,563, reissued as U.S. Pat. No. Re. 36,951, to place a leak detection dye into a closed air conditioning or refrigeration system prior to the initial charging of the system. This desirably limits the possibility of inadvertent contact between the dye and the exterior of the air conditioner system or personnel responsible for installing and charging the air conditioning system. As discussed in Re. 36,951, it is known to saturate an absorbent wafer, or other suitable substrate carrier, with a mixture of a dye and a solvent, such as a refrigerant system lubricating oil. This system of placing dye on the substrate carrier is sometimes known as a "wet" system because the dye remains in a liquid state.

It is also known to place a leak detection dye onto a wafer by saturating the wafer with a mixture of dye powder and alcohol. Following evaporation of the alcohol, the dye remains in the form of dye solids dispersed through the wafer. This system of placing dye onto a carrier wafer is sometimes referred to as a "dry" system because of the evaporation of the alcohol from the saturating mixture that contains the dye component.

The dye carrying wafer, or other substrate, will remain in the closed air conditioning or refrigeration system. Therefore, following the initial delivery of leak detection dye from the wafer to the system, the presence of the wafer in the closed system will no longer serve a useful purpose. It is desirable, therefore, that the wafer, or other dye carrier substrate, deliver maximum dye concentration while occupying minimum space.

SUMMARY OF THE INVENTION

The present invention provides a leak detection dye carrier for a closed air-conditioning or refrigeration system formed in a two-stage process. In a first stage, a mixture comprising a dye powder and alcohol is added to a dye carrier. The alcohol is permitted to evaporate such that the dye component of the mixture remains in the form of dye solids dispersed throughout the dye carrier.

In a second stage, a liquid is added to the dye carrier and dispersed dye solids. According to one embodiment, the liquid utilized in the second stage is a mixture of a dye and a solvent, preferably a refrigerant system lubricant.

According to one method of forming the dye carrier, dye carrier is immersed within the liquid and the duration of contact during the second stage is limited so as to prevent the dye solids from being dissolved by the liquid. Instead, the dye solids are coated by the liquid. The liquid used to coat the solids in the second stage may comprise a solvent, preferably a refrigerant system lubricant, such that the dye solids are softened and placed in an activated condition.

Other objects, aspects and advantages of the present invention will become apparent to those skilled in the art upon reading the following detailed description, when considered in conjunction with the appended claims and the accompanying drawings briefly described below.

BRIEF DESCRIPTION OF THE DRAWINGS

For the purpose of illustrating the invention, the drawings show a form of the invention which is presently preferred; it being understood, however, that the invention is not limited to the precise arrangement and instrumentality shown.

FIG. 3 is a sectional view of a receiver-dehydrator unit having installed therein a desiccant bag containing a dye-wafer according to the invention;

DESCRIPTION OF THE PREFERRED EMBODIMENTS

Figure 1:
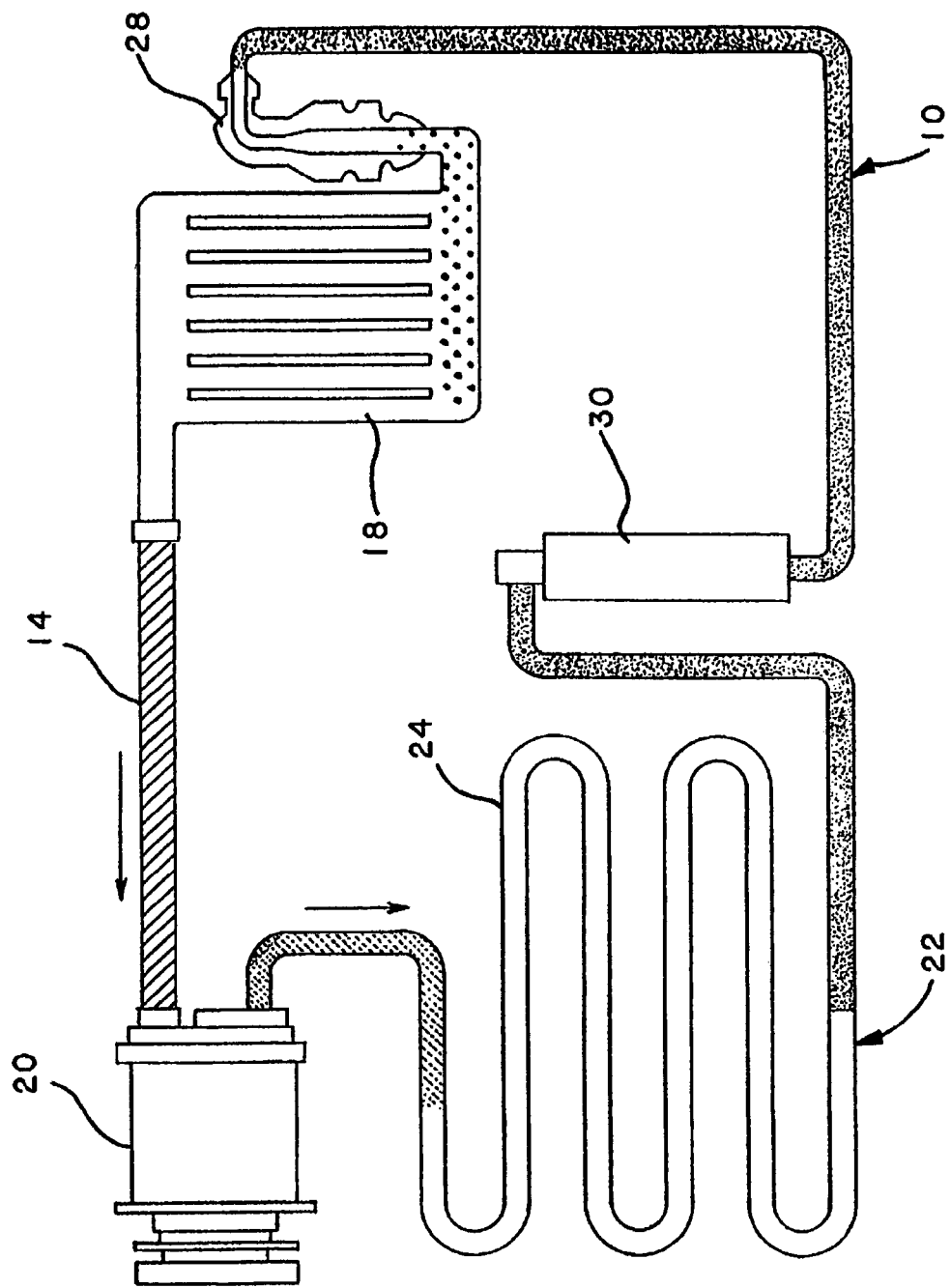
FIG. 1 is a schematic illustration of a basic refrigeration system of an automobile air conditioner, using a receiver-dehydrator between the condenser and evaporator.
Figure 2:
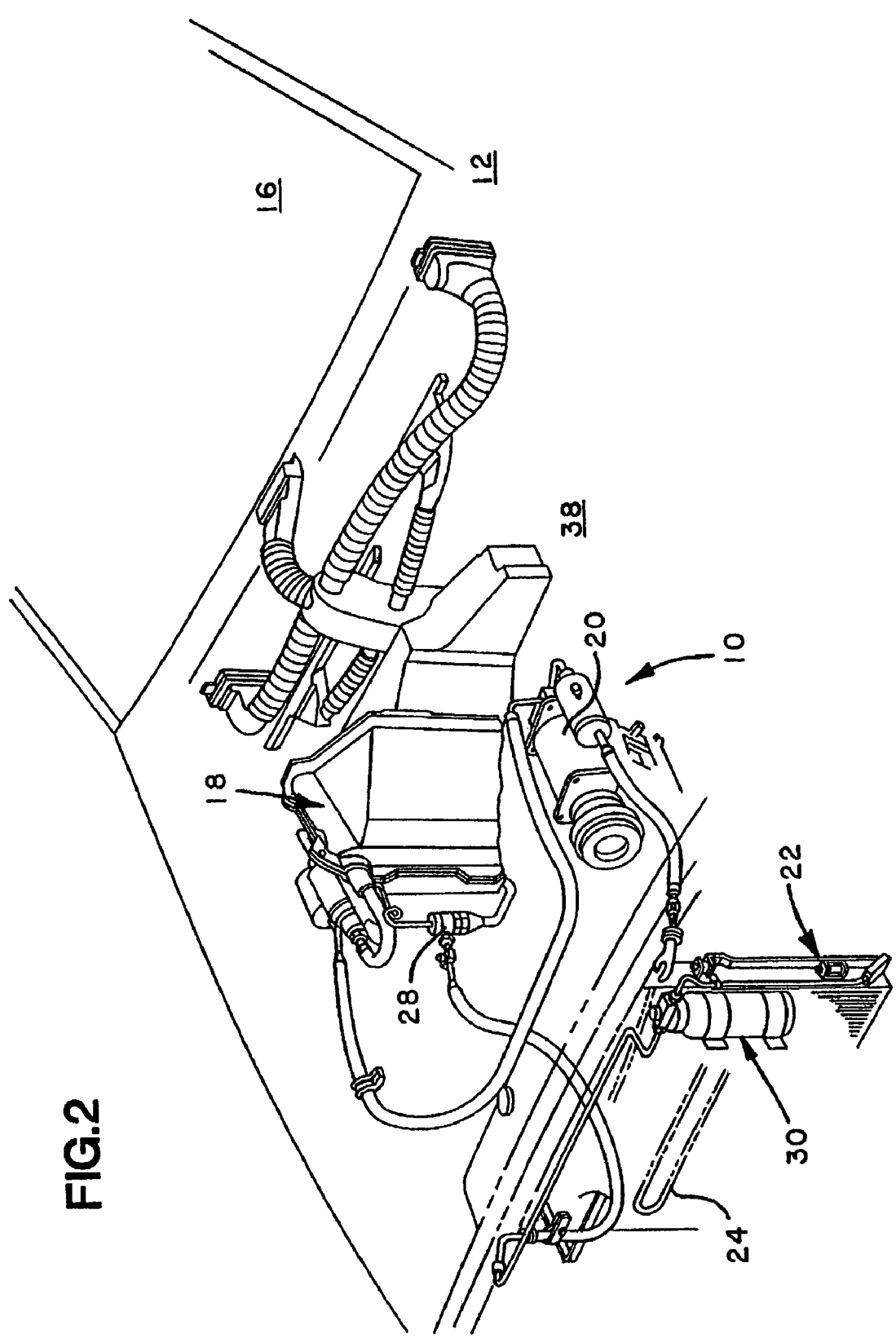
FIG. 2 is a perspective view of an automobile air conditioner system showing the major components as installed in an automobile.

Referring to the drawings in detail, wherein like numerals indicate like elements, FIG. 1 illustrates a basic closed refrigeration circuit 10 of an automobile air conditioner, by which air inside the automobile is cooled and dehumidified. FIG. 2 provides greater detail of the system 10 as it is arranged in an automobile 12.

A refrigerant 14, such as R-12 or more recently R-134a, circulates under pressure in the air conditioning/refrigeration system. In each cycle, the refrigerant is caused to change phase from liquid to gas and back to liquid, absorbing heat from the passenger compartment 16 and releasing heat outside the compartment.

More specifically, the air conditioning system 10 has an evaporator unit 18 where subcooled liquid refrigerant enters and is allowed to expand and absorb heat from warm air of the passenger compartment, causing the refrigerant to vaporize. The warm air of the passenger compartment 16 is connected to the evaporator 18 via ducting, as seen in FIG. 2, such that the cooled and dried air is recirculated into the passenger compartment. After absorbing heat from the passenger compartment, the refrigerant gas is drawn from the evaporator by suction into a compressor 20, which compresses the gas, thereby raising its pressure and temperature. The high-pressure hot vapor is passed through a condenser 22, in which the vapor is exposed to a large cooling-surface area by flowing through a labyrinth of finned-coils 24 over which outside air is rapidly blown to transport heat away from the vapor. The refrigerant 14 cools to the condensation temperature, releases its heat of condensation, and changes phase back to a hot liquid, still at a high pressure. The refrigerant 14 completes the cycle by passing through a thermostatic expansion valve 28, which meters the high pressure liquid refrigerant 14 as a low pressure spray into the evaporator 18.

In some systems it is necessary to reservoir the liquid refrigerant before it is metered through the expansion valve because the demand of the evaporator varies under varying conditions. In other systems it is a practice to install an accumulator between the evaporator and compressor so that no liquid can enter the compressor. In either system, water contamination in the refrigerant can cause the water vapor to freeze at the point of expansion, causing refrigerant flow to be blocked, and to react with refrigerants to form acids that may cause internal damage to metal parts. Consequently, in the depicted embodiment a receiver-dehydrator, also referred to as receiver-drier, 30 is located between the condenser 22 and the evaporator 18 to reservoir the refrigerant and remove moisture from it. In other air conditioner systems, an accumulator-dehydrator may be located between the evaporator and compressor to accumulate the refrigerant vapor and remove moisture from it. As shown in FIG. 3, the receiver-dehydrator 30 contains a filter 32 to remove foreign particles and a bag 40 of desiccant material 34 to remove moisture from the circulating refrigerant 14.

Although not depicted, it will be understood by those skilled in the art that desiccant bags are also used in the accumulator of a cycling clutch orifice tube (CCOT) type of automobile air conditioner, and in the Valves-in-Receiver (VIR) assembly of VIR type air conditioners, and may be found in other locations of the refrigerant circuit in other types of refrigeration systems. A dye-additive swatch may be placed in the desiccant bags used with any such system.

As shown in FIG. 2, the air conditioning system components are located in different parts of the engine compartment 38 and attached to various other components of the automobile. Thus, final assembly of the air conditioner usually occurs at the time of its installation into the automobile, and the system cannot be charged with refrigerant until this point. When the air conditioner is assembled and installed in the automobile, the system is evacuated to remove air and moisture prior to charging with refrigerant. The system is charged by releasing refrigerant under pressure from a container through the system service valves to enter the system.

Since the refrigerant is under considerable pressure in a container or service hose, there is a risk of its inadvertent escape and contamination of surroundings. The automobile assembly workers charging the air conditioners typically wear safety goggles, gloves and protective clothing, and use rags to wipe valve fittings. This creates the problem that if the exterior of the air conditioner is contaminated by escaping refrigerant or dye during charging, or by contact with contaminated clothing, the dye additive in the refrigerant will fluoresce under ultra-violet illumination and give false leak indications.

Referring to FIG. 3, a dye carrier wafer 52 is provided which is preferably designed to be placed within the above-described desiccant bag 40. As will be discussed further on, it is also contemplated that the dye carrier wafer 52 may be placed in other components of the air conditioning system. Furthermore, it is contemplated that the dye carrier wafer 52 may be incorporated into other systems, besides air conditioning systems, which require or can benefit from leak detection dyes or carrier transmission of an additive.

The dye carrier wafer 52 is made from a substrate material that is absorbent to liquid but does not react with the refrigerant or system lubricant circulated through the closed refrigeration system. The wafer 52 is preferably of a matrix construction. The wafer 52, in the manner described below in greater detail, carries a leak detection dye that will be released into the refrigeration system from the wafer when the system is charged with a circulating refrigerant. Thus the dye carrier wafer 52 can be safely and neatly placed within the closed refrigeration system circulated before the system is charged with refrigerant.

As described in U.S. Pat. No. 5,650,563, reissued as U.S. Pat. No. Re. 36,951, which is incorporated herein by reference in its entirety, a preferred wafer for use inside desiccant bag 40 is made from a melamine treated 100% polyester felt mat cut into circular disks or wafers such that there are no loose fibers or felt residue from the cutting procedure. Reissue '951 described that the wafer preferably has a circular shape ¾ of an inch in diameter and a thickness of 0.315 inches. The dye carrier wafer 52 of the present invention, however, may be formed in a two-stage process which provides for delivery of the same dye concentration into a charged refrigeration system using a smaller wafer configuration.

The specific amount of leak detection dye that needs to be carried by the carrier wafer 52 will depend on the volume of refrigerant and lubricant circulated through the system, the concentration of dye and lubricant to be placed into the circulating refrigerant necessary so as to make leaks visible, and the amount of dye that can exist in the system without adversely effecting its operation. It should be understood that the substrate material from which the wafers 52 are formed can be cut to size either prior to or after dye is dispersed through the dye carrier material using the two-stage process of the present invention. The dye carrier wafers 52 may be packaged in quantity, such as 1000 for example, for shipment to a desiccant bag manufacturer or a receiver-dehydrator manufacturer.

The desiccant bag 40 is itself then installed in receiver-dehydrator 30. Sealed receiver-dehydrators are shipped to the automobile or engine assembly plant to be installed in the air conditioning system as it is assembled. Upon the air conditioning system 10 being fully connected, it is evacuated and then charged with its initial refrigerant 14. Upon charging and running the system, the dye is mixed with and dissolved in the refrigerant 14 as the refrigerant travels through the desiccant bag 40.

Other substrate materials, such as natural or synthetic sponge, sintered brass or other metals, or even the desiccant beads may be substituted for those described above. The substrate may have various shapes, and quantities and dimensions may be varied as desired for specific applications.

Figure 4C:
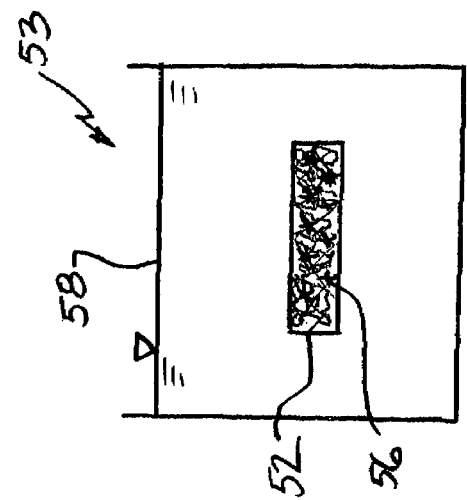
FIGS. 4A through 4C schematically illustrate a method of forming a leak detection dye carrier according to the invention.
Figure 4B:
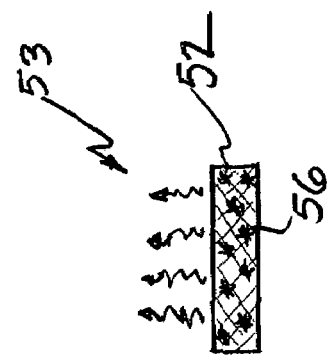
Figure 4A:
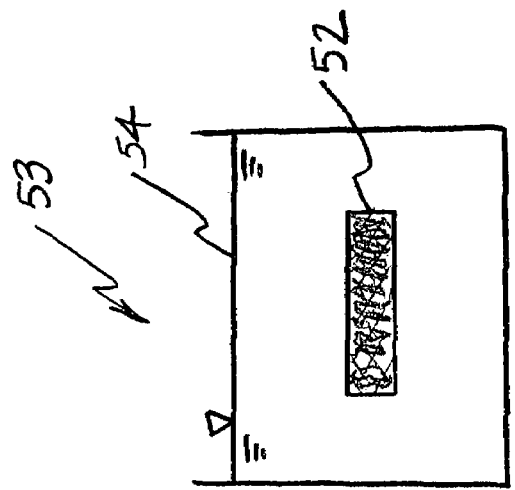

Referring to the FIG. 4A through 4C, a method 53 of forming a dye carrier wafer 52 according to the present invention is shown schematically. The method 53 utilizes a two-stage process for placing a dye onto the wafer 52, or other suitable substrate carrier, for delivery of the dye into a circulating refrigerant of a closed air-conditioning or refrigeration system in a desired concentration.

In a first stage of the two-stage process 53, the wafer 52 is wetted or saturated with a mixture 54 comprising a dye powder and an evaporable carrier liquid or solvent, such as an alcohol, acetone, a high boiling point refrigerant or even water. Preferably, the mixture 54 is a dye/alcohol mixture which is applied to the wafer 52 by immersing the wafer into a quantity of the dye/alcohol mixture. Immersion of the wafer 52 is not required, however, and other means could be used to apply the mixture 54 to the wafer 52 resulting in absorption by the wafer of a suitable amount of the dye/evaporable solvent mixture. Preferably, the wafer is saturated with the mixture.

Referring to FIG. 4B, the wet wafer 52 is then exposed to an environment and for a sufficient amount of time to permit the evaporable solvent from the mixture 54 to evaporate. As a result of the evaporation of the solvent, the dye component of the applied mixture 54 remains on the substrate wafer 52 in the form of dye solids 56 dispersed throughout the wafer 52.

Referring to FIG. 4C, the second stage of the method 53 of forming the dye carrier wafer 52 according to the present invention is shown schematically. In the second stage of method 53, a second liquid 58 is applied to the wafer 52 and dispersed dye solids 56. Preferably, the second liquid is applied by immersing the product in a wet bath containing the second liquid 58. In one embodiment, the second liquid is a mixture of a dye and a solvent.

Thus, the first and second stages of method 53 is a hybrid process of dry and wet systems, respectively, for applying dye to a substrate carrier. For embodiments where the liquid applied in the second stage includes a dye, the concentration of the dye in the wet bath of the second stage of method 53 can be adjusted to control the total amount of dye to be carried by the wafer 52 following the hybrid dry/wet process. For example, assume that the first dry stage of method 53 results in 0.14 grams of dye solids being dispersed throughout the wafer 52. Assume further that the wafer 52 can absorb an additional 0.16 grams of liquid in the second wet stage of method 53. For the wafer 52 to carry a total of 0.20 grams of dye following the hybrid dry/wet process, then the wet bath utilized in the second stage of method 53 should contain a mixture including sixty percent system liquid solvent and forty percent dye.

Figure 5:
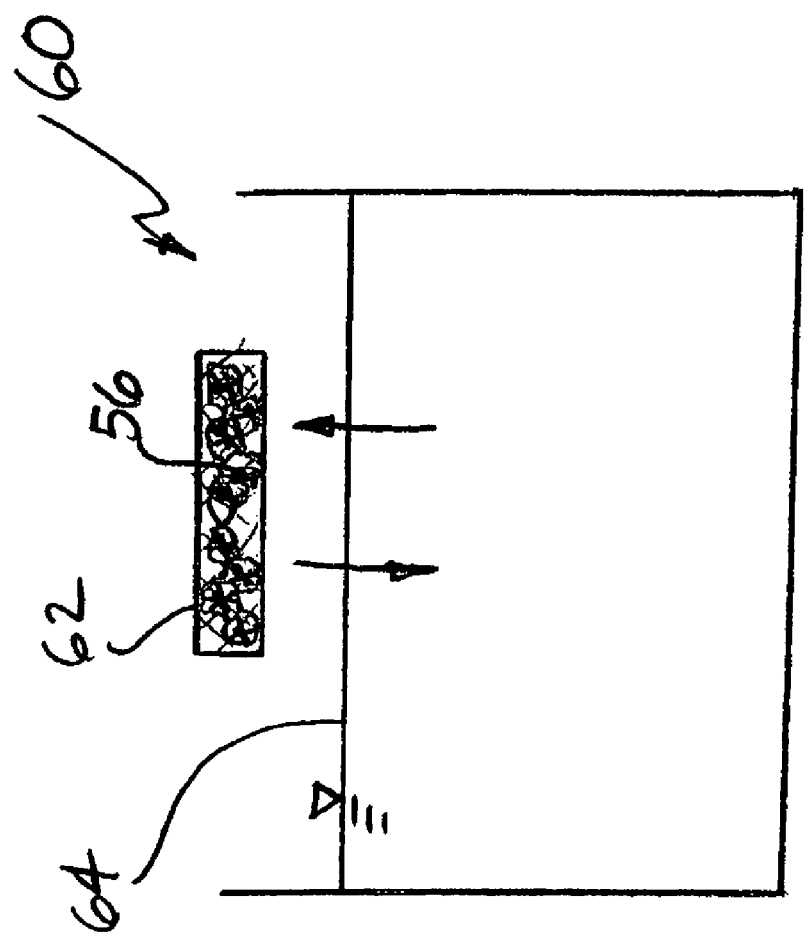
FIG. 5 schematically illustrates the second stage of a method of forming a leak detection dye carrier according to a second embodiment of the invention.

Referring to FIG. 5, there is illustrated schematically a method 60 of forming a dye carrier wafer 62 according to a second embodiment of the invention. Like the above-described hybrid dry/wet method 53, the method 60 is a two-stage process. The first stage of method 60, like that of method 53, uses a dry system in which dispersed dye solids 56 are formed by saturating the wafer 62 with a mixture of dye powder and an evaporable solvent, and allowing the solvent to evaporate.

In the second stage of method 60, the wafer 62 with dispersed dye solids 56 has a liquid applied to the solid laden dye wafer to enhance the dye wafer. The application of the liquid in the wet stage can be applied by dipping the wafer into a wet bath containing the desired liquid 64. The amount of time that the wafer 62 remains immersed in the liquid 64 during the second stage of method 60, however, is limited such that the dispersed dye solids 56 are not dissolved by the liquid 64 but, instead, are merely coated and softened by the liquid 64.

The liquid 64 of the wet bath used to coat the dye solids 56 in the second phase of method 60 could vary. According to one preferred embodiment, the liquid 64 of the wet bath of method 60 could include a mixture of dye powder and an evaporable solvent, like that used during the first stage. The volume of liquid 64 absorbed by the wafer 62 during the second stage of method 60 will typically be less than the volume absorbed during the first stage of method 60. However, the second stage enhances the dye concentration in the wafer.

Alternatively, the liquid 64 of the wet bath of method 60 could include an additive, such as a solvent without a dye, for example, a system lubricant. As described above, the time that the wafer 62 remains immersed in the additive is preferably limited to prevent the dispersed dye solids 56 formed in the first stage from being dissolved during the second stage. The additive coating on the dispersed dye solids 56 softens the dye solids, thereby placing them in an "activated" condition such that subsequent introduction of the dye into the refrigeration system following charging of the system will occur more rapidly.

The dyes used in the two-stage process of the present invention could include naphthoxanthene, perylene and naphthalene compounds, such as Naphtho{3,2,1-k1}xanthene-2,8-dialkyl 3,9-perylenedialkylacetate 4-alkylamino-n-alkyl-naphthalimide Dinaphtho(1,2,3-cd; 1'2'3-1m)perylene-9,18-dione,alkyl derivatives.

The dye must be stable at operating temperatures of the A/C or refrigeration system, and should not change the properties of the refrigerant or the system lubricant or adversely effect components and parts of the system.

One of the benefits provided by the present invention is the ability to increase the amount of dye concentrate that can be included in a wafer. Accordingly, using the present invention, the same amount of concentrate as in a prior art wafer can be achieved using a thinner or smaller wafer. Thus, after the dye is dispersed, there is less wafer remaining in the system.

Also, the inclusion of wet dye with the dye solid laden wafer results in a wafer that will provide faster disbursement of the dye since the wet liquid will mix with the refrigerant quickly while the dry dye solids begin to dissolve.

Furthermore, as discussed above, the application of the second or wet stage to the wafer with dye solids, softens the solids, "activating" them. Thus, the softer dye solids will dissolve quicker than prior art dry dye wafers.

The foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method of manufacturing a leak detection dye carrier of the type placed in a closed air-conditioning or refrigeration system for delivering a dye into the system when the system is charged with a circulating refrigerant, the method comprising the steps of:
   selecting a dye carrier material capable of absorbing a liquid;
   mixing a powdered dye with an evaporable solvent;
   applying the mixture of dye and evaporable solvent to the dye carrier material;
   allowing the evaporable solvent to evaporate from the dye carrier material resulting in a plurality of dye solids being dispersed on the dye carrier material; and
   applying a liquid to the dye carrier material, wherein the liquid applied to the dye carrier material and dispersed dye solids is a mixture of a dye and a solvent.

2. The method according to claim 1, wherein the evaporable solvent is an alcohol.

3. The method according to claim 1, wherein the solvent is a refrigerant system lubricant.

4. The method according to claim 1, wherein the dye carrier material with dispersed dye solids is immersed in the liquid for a sufficiently short period of time such that the dye solids are softened by the liquid but are not dissolved by the liquid.

5. The method according to claim 4, wherein the liquid in which the dye carrier material with dispersed dye solids is immersed is a mixture of dye powder and an evaporable solvent.

6. The method according to claim 5, wherein the evaporable solvent is an alcohol.

7. The method according to claim 4, wherein the liquid in which the dye carrier material with dispersed dye solids is immersed comprises a refrigerant system lubricant.

8. The method according to claim 1, further comprising the step of:
   forming a wafer from the dye carrier material; and
   placing the wafer within a desiccant bag adapted for receipt within a component of a closed refrigeration system.

9. The method according to claim 1, wherein the dye carrier material is a polyester felt.

10. The method according to claim 1, wherein the dye powder comprises a fluorescent, alkyl substituted perylene dye.

11. The method according to claim 1, wherein the dye powder comprises a fluorescent, alkyl substituted naphthalimide dye.

12. A leak detection dye carrier for placement within a closed refrigeration system for introducing a leak detection dye into the refrigeration system when the system is charged with a circulating refrigerant, the leak detection dye carrier comprising:
   a substrate capable of absorbing a liquid;
   a plurality of dye solids dispersed throughout the substrate; and
   a liquid dispersed through the substrate such that the solids are softened by the liquid in a non-dissolved manner.

13. The leak detection dye carrier according to claim 12, wherein the substrate is a wafer made from a polyester felt.

14. The leak detection dye carrier according to claim 12, wherein the liquid coating the dye solids comprises a refrigeration system lubricating oil.

15. The leak detection dye carrier according to claim 12, wherein the dye solids comprise a fluorescent, alkyl substituted perylene dye.

16. The leak detection dye carrier according to claim 12, wherein the dye solids comprise a fluorescent, alkyl substituted naphthalimide dye.

17. A leak detection dye carrier for placement within a closed refrigeration system for introducing a leak detection dye into the refrigeration system when the system is charged with a circulating refrigerant, the leak detection dye carrier comprising:
   a substrate;
   a dye solid disposed on substrate; and
   a liquid disposed on the substrate prior to introducing the dye carrier to a refrigeration system.

18. A method of manufacturing a leak detection dye carrier of the type placed in a closed air-conditioning or refrigeration system for delivering a dye into the system when the system is charged with a circulating refrigerant, the method comprising the steps of:
   providing a dye carrier;
   applying a mixture including a dye and an evaporable solvent to the carrier;
   permitting the solvent to evaporate so as to leave dye solids on the carrier; and
   applying a liquid to the dye carrier prior to introducing the dye carrier to a refrigeration system.

19. A method of manufacturing a leak detection dye carrier of the type placed in a closed air-conditioning or refrigeration system for delivering a dye into the system when the system is charged with a circulating refrigerant, the method comprising the steps of:
   selecting a dye carrier material capable of absorbing a liquid;
   mixing a powdered dye with an evaporable solvent;
   applying the mixture of dye and evaporable solvent to the dye carrier material;
   allowing the evaporable solvent to evaporate from the dye carrier material resulting in a plurality of dye solids being dispersed on the dye carrier material; and
   applying a liquid to the dye carrier material, wherein the liquid is applied prior to introducing the dye carrier material to a refrigeration system.

* * * * *